G. R. WINKLER.
ROTARY-DISK STEAM-ENGINES.

No. 194,281. Patented Aug. 14, 1877.

Attest:
J. H. Seely
D. T. Dyer

Inventor:
Gustavus R. Winkler
by Geo. W. Dyer & Co.
Atty's

G. R. WINKLER.
ROTARY-DISK STEAM-ENGINES.

No. 194,281. Patented Aug. 14, 1877.

Attest:
L. H. Seely
R. T. Dyer

Inventor:
Gustavus R. Winkler
by Geo. W. Dyer & Co.
Attys.

G. R. WINKLER.
ROTARY-DISK STEAM-ENGINES.

No. 194,281. Patented Aug. 14, 1877.

Attest:
L. W. Seely
R. N. Dyer

Inventor:
Gustavus R. Winkler
by Geo. W. Dyer & Co.
Attys.

G. R. WINKLER.
ROTARY-DISK STEAM-ENGINES.

No. 194,281. Patented Aug. 14, 1877.

Attest:
L. H. Seely
R. T. Dyer

Inventor:
Gustavus R. Winkler
by Geo. W. Dyer
attys

G. R. WINKLER.
ROTARY-DISK STEAM-ENGINES.

No. 194,281. Patented Aug. 14, 1877.

UNITED STATES PATENT OFFICE.

GUSTAVUS R. WINKLER, OF WILLIAMSPORT, PENNSYLVANIA, ASSIGNOR OF PART OF HIS RIGHT TO JOHN W. HAYS, ADOLPH NIEMEYER, HERMON HINCKLEY, AND THEODORE HILL, ALL OF SAME PLACE.

IMPROVEMENT IN ROTARY-DISK STEAM-ENGINES.

Specification forming part of Letters Patent No. 194,281, dated August 14, 1877; application filed October 26, 1876.

*To all whom it may concern:*

Be it known that I, GUSTAVUS R. WINKLER, of Williamsport, in the county of Lycoming and State of Pennsylvania, have invented a new and useful Improvement in Rotary-Disk Engines; and I do hereby declare that the following is a full and exact description of the same, reference being had to the accompanying drawings, and to the letters of reference marked thereon.

The object I have in view is an improvement upon the rotary engine for which Letters Patent of the United States numbered 167,146 were granted to me August 24, 1875, with a view to making the same more effective, as well as more economical in use; and my improvement herein consists, mainly, in a double engine, each part of which is double and is placed upon and operates a shaft common to both parts, the steam which operates the first part of the engine passing out of it and through a reheater, and then entering the second part of the engine and operating that; and in the novel construction and arrangement of the various operative devices; and in the combination of the several operative parts of the engine, all as more fully hereinafter described and explained.

In order that those skilled in the art may know how to make and use my engine, I now proceed to describe the same, having reference to the drawings making a part of this specification, in which—

Similar letters in each figure denote corresponding parts.

A and B represent two rotary engines, which are connected end to end, so as to form a double engine, which may be mounted upon any suitable base, and may be used to the best advantage with a reheater, C, which, for convenience, is shown as placed directly beneath the engine A, but may be located in any other convenient position. Under certain circumstances the double engine may be used without a reheater; but it cannot, in my opinion, be done with advantage; but the reheating may be done in the boiler by allowing the steam, after it has passed through the first engine, to traverse through the boiler or fire-box, or both, before it passes into the second engine. I use the word "reheater" as a matter of convenience; but it will be perceived hereinafter that the purpose of this vessel, chamber, or box C, in addition to reheating the steam, is to afford a space where the steam, which enters by pulsations from the first engine, may be received, and may issue without pulsations in a regular current or volume. D is the shaft, which passes through both engines and their disks, and is operated by both conjointly, and E E' are the disks of the two engines, which are secured upon the shaft, and by their revolution cause the shaft to rotate.

Figures 19, 20, 21, 22, 26, 27:
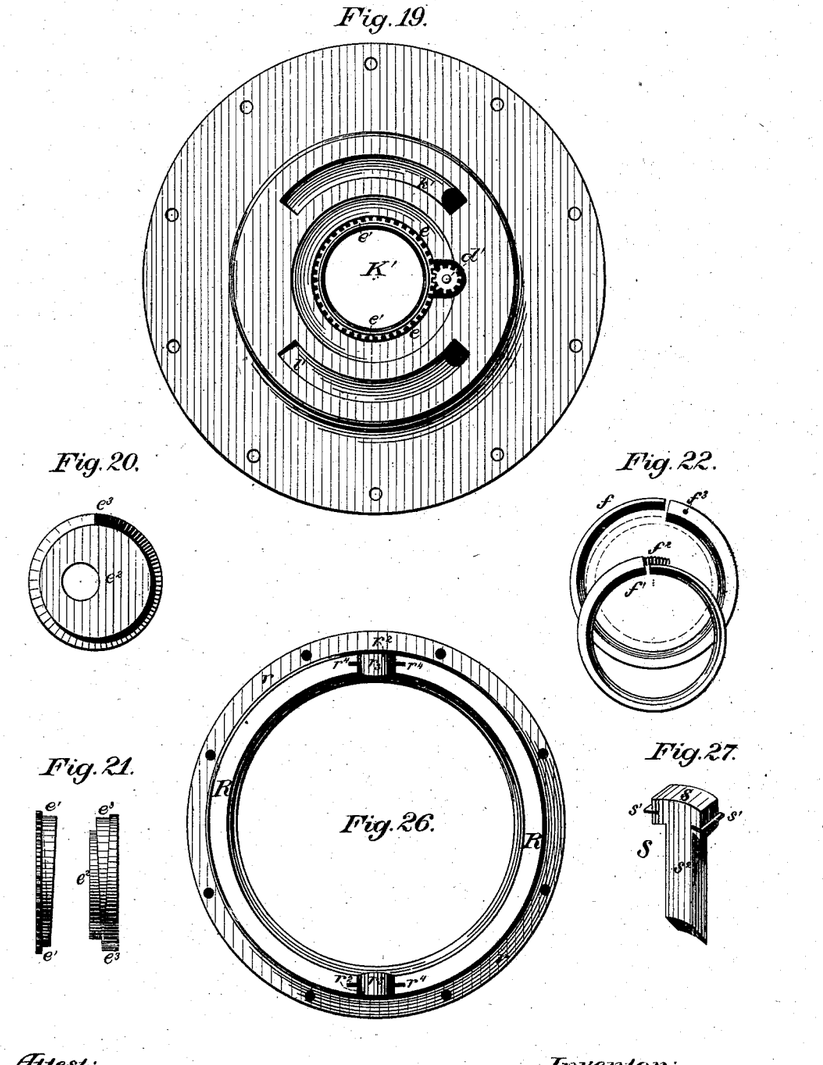
Fig. 19, a view of one of the head-plates with the packing contrivances for the bosses of the disk removed, showing the rack and pinion in position.
Figs. 20 and 21, separate views of one of the plates.
Fig. 22, a separate view of the divided packing-rings.
Fig. 26, a view of one of the cylinder-rings.
Fig. 27, a view of the packing attached to the same.
Figure 23:
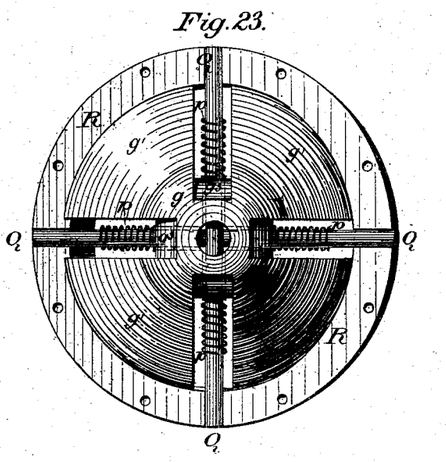
Fig. 23, a view of the disk without its piston-wings and with one of the cylinder-rings.
Figure 24:
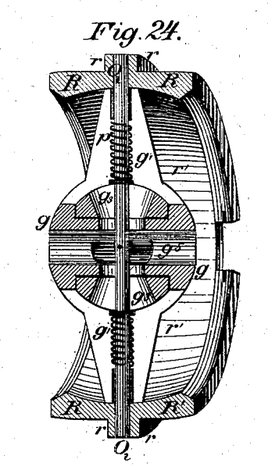
Fig. 24, a cross-section of the cylinder-rings.
Figure 25:
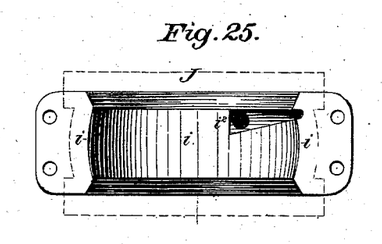
Fig. 25, a view of one-half of the cylinder-casing of engine.
Figures 28, 29:
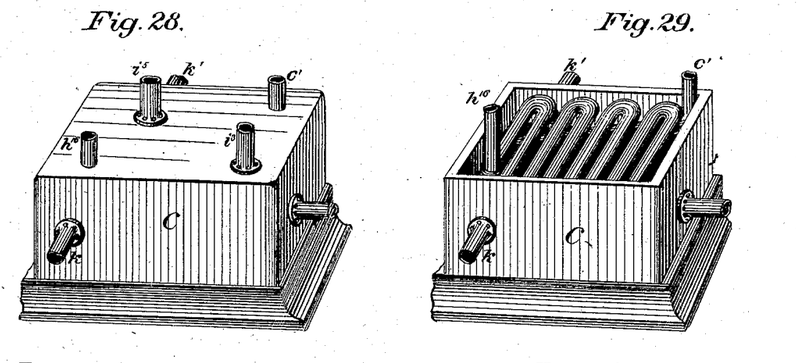
Fig. 28, a view of the reheater, partly in perspective, from above.
Fig. 29, a view of the same with the top removed.

The engine A is constructed as follows: There is a head-plate, F, having on its outside a stuffing-box, $a$, for the shaft, a circular box, $b$, and a port, $c$, through which the live steam enters the engine by the pipe $c'$, and a hand-wheel or equivalent for operating a pinion, $d^1$. The shaft, it will be perceived, passes through this head a little on one side of the center thereof. On the inside of the head is a circular chamber, $e$, Fig. 19, into one side of which the pinion $d^1$ enters, and there engages with an annular rack, $e^1$, and causes the same to be rotated. The body of a flanged plate, $e^2$, fits into the interior of this gear, and its flange $e^3$ rests upon it, or the top of a ring connected with it, which is an inclined plane. The under side of the flange $e^3$ is an inclined plane, so that by the turning of the pinion the gear is turned, and, its inclined plane acting upon the inclined plane of the flange, the action of both combined is that of a screw or wedge, and the flanged plate is forced up to its work. The center $e^4$ of this plate is hollowed out in a globular form to correspond with the boss of the disk which works in it. Upon the surface of the flanged plate just described is placed the divided packing-rings $f f^1$, of proper metal, each ring being thick at one end and gradually growing thinner to the other end, and placed one inside of the other, with their thickest ends toward each other. The interior of the inner ring $f^1$ is beveled and hollowed out to correspond with the globular form of the boss of the disk. A spring, $f^2$, is placed between the thickest ends of both rings, and the inner ring being stationary, by means of a pin, $f^3$, the ring $f$ is forced around, and the rings being placed with their inclines in opposite directions, the ring $f$ is forced outwardly and the ring $f^1$ is forced inwardly at the same time. This operation is assisted materially by the action of the steam which enters between the ends of the springs, by the heat created by the steam, and the friction of the boss upon the inner ring, by which means there is an expansion of the metal composing the rings.

Into the globular recess formed, as described, in the flanged plate $e^2$ and the packing-ring $f^1$ a portion of the correspondingly-globular boss of the disk E rotates. This disk is composed of two spherical bosses, $g$ $g$, and flanges $g^1 g^1$; and if the lines of curvature of the two bosses were prolonged through the bases of the flanges, the two bosses would be one perfect sphere. These flanges are, in cross-section, the frustum of cones, and are separated from each other by rectangular openings $g^2 g^2$, which extend into the bosses $g$ $g$, the base of each opening being an outwardly-curved slat, $g^3$, which may be removable, and upon which the base of the piston-wing H rests, and is enabled to have motion sidewise. Through the center of the boss is an opening, $g^4$, through which the driving-shaft passes at right angles.

In the periphery of the flanges are grooves $g^5$, extending down each side of the opening $g^2$, in which is placed a packing, G. This packing is made of two similar pieces, $g^6 g^6$, of suitable metal, each having a corresponding groove, $g^7$, in the interior, adapted to be filled with an elastic packing, $g^8$, a little larger than the groove. By putting the two pieces together, with the packing $g^8$ between them, the two pieces may be screwed together just sufficiently to fit tightly into the grooves $g^5$. This packing G is made most conveniently in three sections, one being the portion on the groove in the periphery of the flange $g^1$ and the other portion in the grooves in the sides of the opening $g^2$, and their ends, which meet, should be beveled to make an accurate fit; and the separate pieces $g^6 g^6$ should at that point also break joints. The steam, getting under this packing G, presses each section of it outwardly and up to its work.

Figure 1:
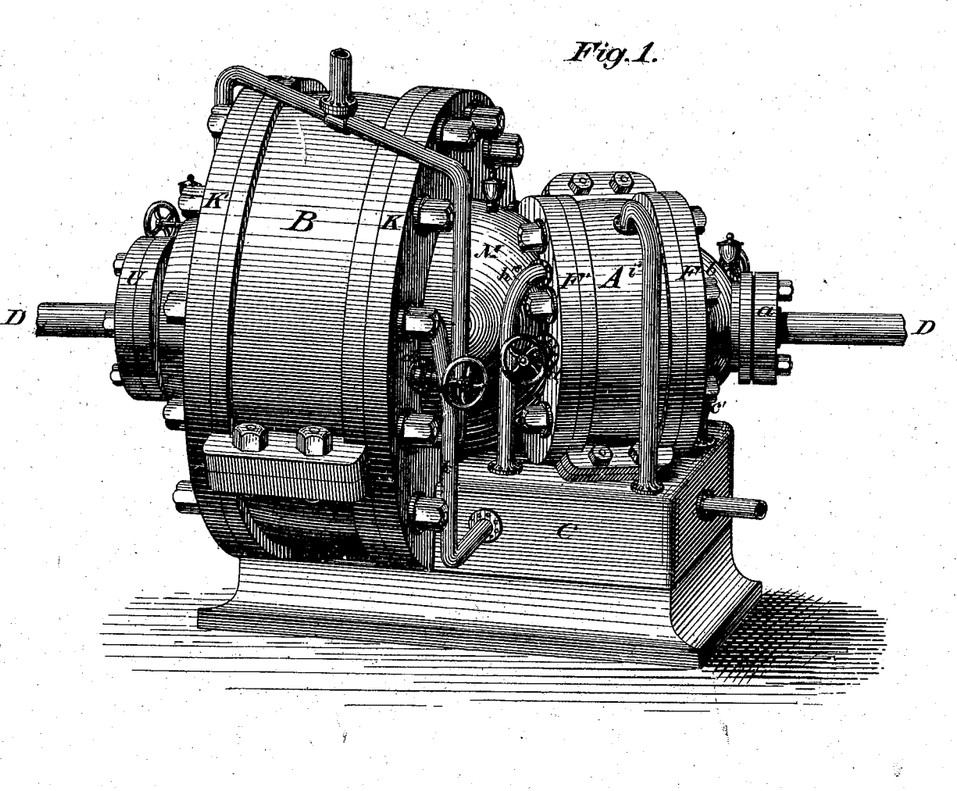
Figure 1 represents an elevation of my engine, partly in perspective.
Figure 2:
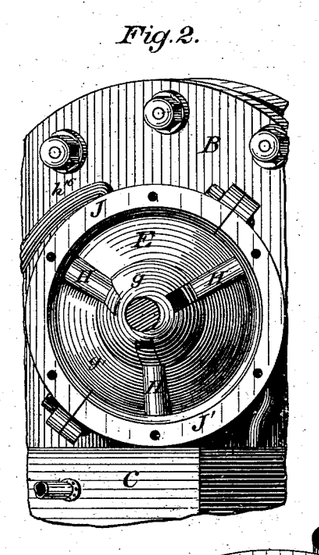
Fig. 2, an elevation of the front of the same with the head-plate removed.
Figure 3:
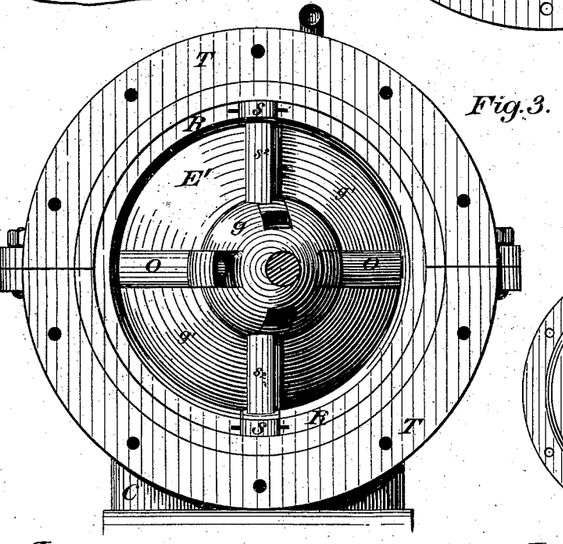
Fig. 3, an elevation of the rear end of the same with head-plate removed.
Figures 4, 5, 8:
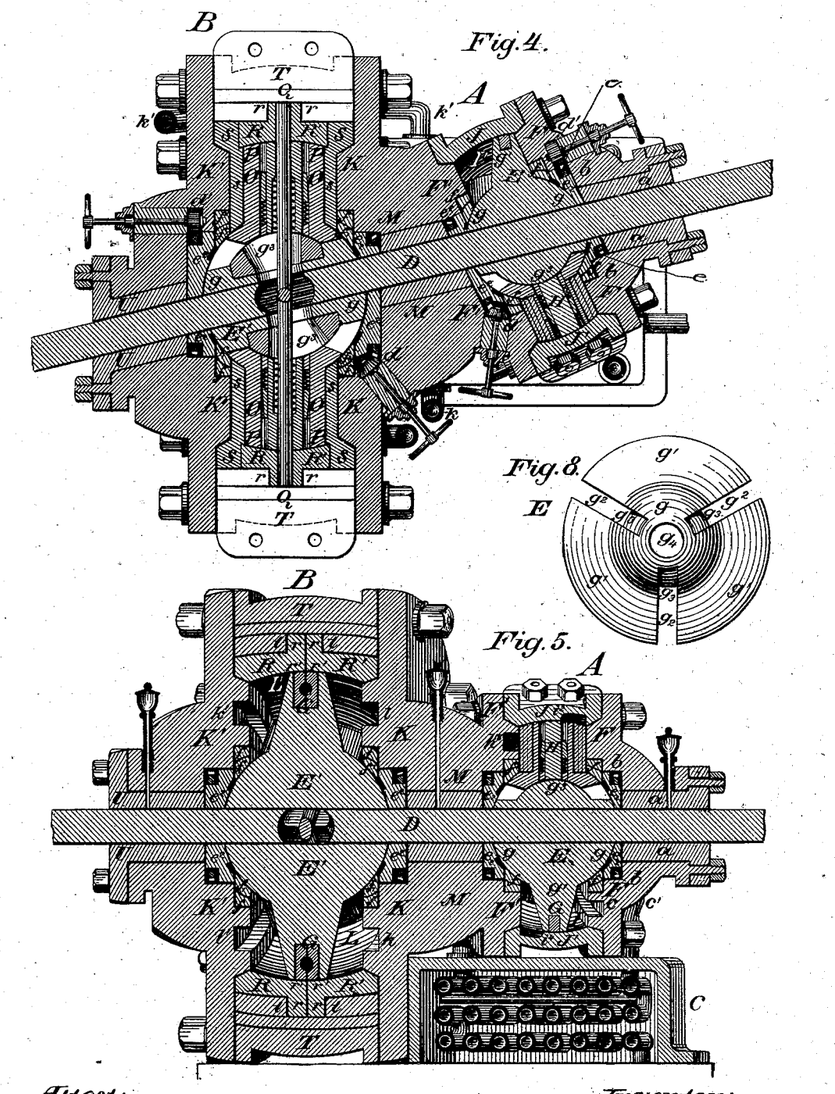
Fig. 4, a central horizontal section on the line of the driving-shaft.
Fig. 5, a central vertical section on the line of the driving-shaft.
Fig. 8, a separate front view of one of the disks with the piston-wings removed.
Figure 6:
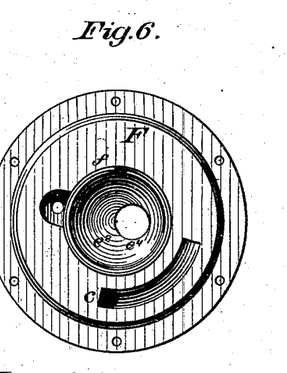
Fig. 6, a separate view of the inside of the head-plates of the first engine.
Figure 7:
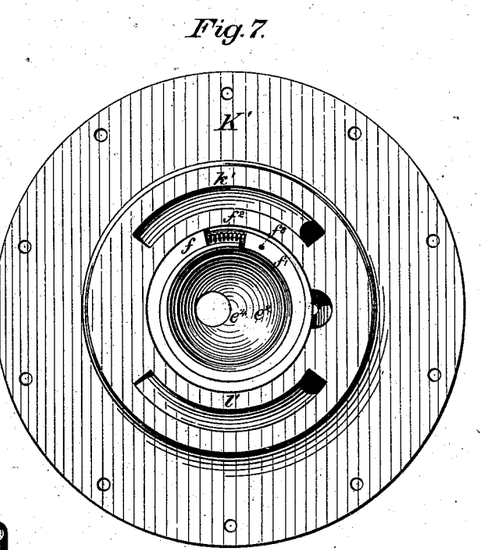
Fig. 7, a separate view of the inside of the head-plates of the second engine.
Figure 9:
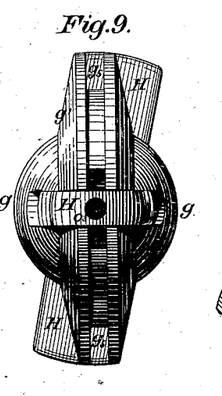
Fig. 9, a separate side view of the disk with the piston-wings in position.
Figure 10:
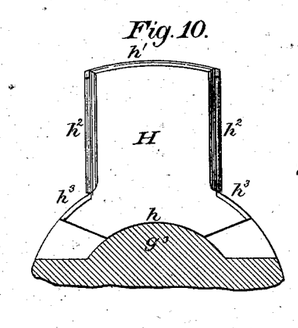
Fig. 10, a separate front view of one of the piston-wings in position.
Figure 11:
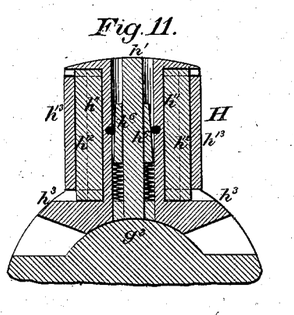
Fig. 11, a central vertical section of Fig. 10.
Figure 12:
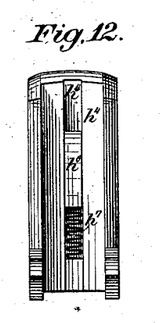
Fig. 12, a similar side view of one of the piston-wings without the packing, showing the wedge-block in position.

The piston-wing H, of the form shown particularly in Figs. 9 and 10, has its base $h$ curved to fit the corresponding curvature of the seat $g^3$, and in outline has a strong resemblance to an ordinary stiff hat, such as men wear, with a curved top, $h^1$, parallel sides $h^2$, and beveled two-curved flanges $h^3$, whose curvature corresponds with the curvature of the bosses $g$ $g$.

When this wing is pressed to its fullest extent to one side of the disk the opposite side $h^2$ of the wing should coincide with the lines of the flange $g^1$, and on the other side the flange $h^3$ should extend to the outer end of the opening in the boss, and its curvature correspond with the curvature of the boss. By means of the curvature of the seat and of the bottom of the wing, as before described, the wing in its operation slides and rocks at the bottom from one side of the opening to the other, while the body of the wing has a movement from side to side just so far that in each oscillation the outside of the wing just comes in line with the outside of the opposite flange of the disk.

This piston-wing H has also its packing, which is constructed and arranged as follows: This wing has a deep rectangular recess, $h^4$, in each side edge, and at the bottom of each recess a central rectangular groove, $h^5$, extending from the top to the bottom. In this groove there is placed, near the center thereof, a wedge-plug, $h^6$, slightly tapering toward its top, and resting at its bottom upon a spring, $h^7$.

Figure 13:
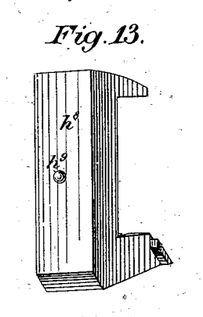
Fig. 13, a front elevation, partly in perspective, of one of the piston-wing packing-frames.
Figure 14:
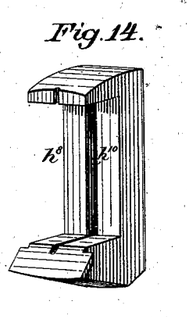
Fig. 14, a similar rear view of the same.
Figure 15:
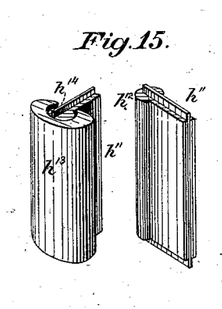
Fig. 15, a view of the packing for the same, and a view of the fin upon which the packing is secured to the frame.
Figure 16:
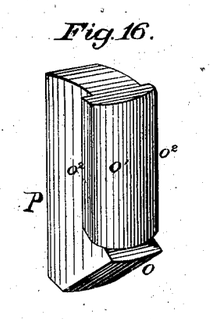
Fig. 16, a perspective of another wing-packing.
Figure 17:
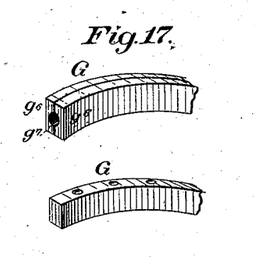
Fig. 17, a view of the packing for the edge of the disks.
Figure 18:
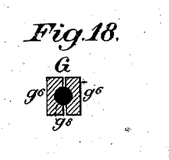
Fig. 18, a cross-section of the same.

Within the recess $h^4$ is placed a packing-frame, $h^8$, the form of which is shown particularly in Figs. 13 and 14, having a projecting top and foot, and extending from the bottom to the top of the recess, and at its ends conforming to the lines and curvatures of the top and bottom of the wing. Upon the center of the back of this packing-frame is placed a pivot $h^9$, which rests against the wedge-plug $h^6$. Now, when the wing is packed, the wedge is forced down before the packing-frame is put in. The spring $h^7$ then exerts its force against the wedge-plug, forcing it upward, and consequently, from its beveled form, pressing the packing-frame outwardly to its work. By means, then, of the oscillation of the packing-frame upon the pivot, the face of the packing in it is automatically kept up to its work at all times equally, to which result the steam behind the packing-frame materially assists. Upon the face of the packing-frame is another groove, $h^{10}$, into which groove is fitted a fin, $h^{11}$, with a cylindrical outer edge, $h^{12}$. The packing proper, $h^{13}$, has a groove, $h^{14}$, on its inner side, of a cylindrical form, into which the edge $h^{12}$ fits with a little freedom, by means of which the packing $h^{13}$ has itself a freedom for oscillation. This packing, as shown in Figs. 14 and 15, has a plane face, rounded edges, and is slightly rounded on the bottom, and by this construction it is always enabled to present a plane surface to the wall of the chamber, against which it is pressed, always tangential to the center of the wing.

The other or inner head, F', of this engine is made in the same manner as described of the outer head, and is provided with the same appliances of plates, packing-rings, and other details, and having a port, $h^{15}$, and pipe $h^{16}$, by which steam enters the chamber I'. The two heads being placed such a distance apart as required by the thickness of the disk, there is left between them steam-chambers I I', one on each side of the disk, and between it and the nearest head. These chambers are covered in by the casing J J', preferably two in number, and constructed with outward flanges, so as to be firmly bolted together. The inner periphery $i$ of this casing is hollowed out in curved lines, so as to correspond with the outer ends or tops $h^1$ of the piston-wings in whatever position the latter may be. A port, $i^2$, having a pipe, $i^3$, takes the steam from the chamber I which entered by the pipe $c'$ into the reheater, and a port, $i^4$, and pipe $i^5$ takes the steam which entered the chamber I' by the pipe $h^{16}$ into the reheater.

As has been before explained, the live steam enters the chambers I I' through the pipes $c'$ and $h^{16}$, which lead from the boiler into the reheater C, and the steam which has passed through the chambers I I' is exhausted into the same reheater C by the pipes $i^3$ and $i^5$. This reheater C is any proper steam-box, which should be suitably jacketed, and within it the pipes $c'$ and $h^{16}$ are coiled in any convenient way, so as to take up a large portion of the area of the chamber of the reheater, and then pass out into the chambers I I', as before described. The pipes $i^3$ and $i^5$, however, open directly into the reheater, and discharge the steam into the same. It is evident, however, that the steam thus discharged into this reheater, having passed through the chambers I I', has parted with a considerable portion of its heat, which I wish to restore to as great a degree as possible, and prevent, as far as I may, any condensation. This result is effected by the heat imparted in the reheater from the coils of the steam-pipes $c'$ and $h^{16}$. As it is apparent, also, that the steam which enters the reheater by the pipes $i^3$ and $i^5$ enters by jets or pulsations, I wish, as far as I may, to restore it to a state of rest before I use it again, and this is effected by exhausting it directly into the reheater by the pipes $i^3$ and $i^5$.

The steam thus reheated and in a state of rest passes out of the reheater by the pipes $k$ and $k'$, the first of which passes through the inner head K of the second engine B, and the latter passes through the outer head K' of the same engine, and into the steam-chambers of such second engine, respectively marked L L'. The engine B stands diagonal to the engine A; but it will be observed at the same time that the disks of each engine stand in parallel lines and at right angles with the driving-shaft. This diagonal position of the two engines is effected by a boss, M, the face of which is tangential to the head K, and upon this face the head F' of the engine A is securely attached. The inner portion of this head K, and also of the head K' is made in the same manner as that described of the head F, and is provided with the same appliances of plates, packing-rings, and other details, except that each of the heads K and K' have an exhaust port, $l\ l'$, which the head F does not have. The disk E' of this engine is, in all particulars of construction and of packing, precisely the same as the disk of the engine A, which has been minutely described already; and the piston-wings O of this disk are, in all particulars, precisely like the piston-wings H, before described, except the packing P. This packing fills the recess in the side edges of the wings O, and may be made in one piece, having its foot $o$ slightly projecting, and its outside $o^1$ with flanges $o^2$, and curved so that when in position its outside covers the outer edges of the wings. It is kept up to its work by a wedge-block and spring, and has its pivot on its inner face, and operates as described of the packing of the wing H. These wings have, however, central longitudinal openings $o^3$, Fig. 9, through which rods Q pass from side to side through the center of the disk, which rods have upon them spiral springs $p$, which operate to push the wings outwardly. These rods pass into the cylinder-rings R R', precisely alike, with flanges $r$, adapted for bolting them together securely. The interior $r^1$ of the two rings, when bolted together, is curved or hollowed out in a segment of a true sphere. Upon the outsides of these rings are rectangular notches $r^2$, with bottoms or seats $r^3$, and in the sides of the notches are grooves $r^4$, which notches are placed directly opposite the rods Q and the edges of the wings O. In these recesses are placed the packing S, of the form shown in Fig. 27, each having a head, $s$, with fins $s^1$, which fit into the grooves $r^4$, and having a body, $s^2$, beveled inwardly on the sides and at the inner end, hollowed out upon the inner face, and having a plane surface on the outer face.

It will be perceived, now, that the sides of the wing O are between two of the packing-pieces S, but do not entirely fill the space between them. As, however, the disk revolves together with its cylinder-rings, in consequence of the diagonal position of the shaft to the two heads, the disk in its revolutions causes the sides of the wings O to regularly approach and recede from each packing-piece, thus opening and closing alternately a space between the packing and the sides of the wings. The purpose of this is to form a steam-joint on each side of the wing by simple mechanism, whereby the edges of the wings would at all changes of planes of direction find similar but constantly-varying points of contact, and dispense with all other packing between the disk and the heads.

It will be observed that the inlet-steam ports through the heads are relatively so placed that the distance between them should be a little less than the distance between the wing-packing of two contiguous wings.

A shell, T, made for convenience in two pieces, and having a recess, $t$, to allow the play within it of the flanges of the cylinder-rings, serves as a casing for this engine, and a stuffing-box, U, upon the outside of the head K', completes the enumeration of the parts of this engine.

It will be perceived that the engine B is larger than the engine A, because it is contemplated that the steam used in it will have less pressure to the square inch than that used in engine A. If, however, means should be employed to introduce heat directly from the boiler-furnace, or in any convenient way, into the reheater, it will be perceived that the two engines might be employed of the same size, or the engine B be of less size than engine A.

The condition of size must be, of course, dependent upon the steam-pressure in each engine, and is matter of ready computation by any skillful engineer.

In the operation of my rotary engine the live steam from the boiler passes, as described, through the coils in its proper pipe in the reheater, and thence diagonally into the chamber I of the engine A. It there strikes the disk and one of its wings, and a portion of the steam, passing under the nearest wing along the extended port, strikes the disk beyond such wing, and also a second wing, and rotates the disk and the driving-shaft. The steam carries the second wing along until the first wing closes the end of the extended port, and at that instant the second wing begins to pass over the exhaust-port, and uncover the same for the escape of steam, as before described, into the reheater. The area of the steam-chamber I constantly advancing during the operation by reason of the diagonal position of the head to the disk, the steam is used expansively as well as by direct impact. At the same instant steam is entering the chamber I' and operating in precisely the same way as just described, each wing in turn coming around and covering and uncovering at the proper time the entrance and exhaust ports, and the packing preserving steam-tight joints by the mechanism before described in detail.

The steam having performed its work in engine A, and having been exhausted into the reheater C, and there reheated and reduced nearly to a state of rest, passes into the chambers of the engine B, and there operates in precisely the same way as in engine A, except that it is exhausted into the open air or into a condenser.

It will be observed that I have described a different manner and construction of packing for engine A than that for engine B. The reason of so doing is that the packing described as applied in engine B is not suitable for a small engine, and that described as applied to engine A is not applicable to a large engine; but if both the engines are of the same size, either style of packing may be used, depending, of course, upon the dimension of the engines.

It will, however, be understood that the packing described will be of such sorts as will be most effective—as, for instance, of steel, of cast-iron, brass, and soft metal.

It will also be observed that, the two engines being placed diagonally to each other, I am enabled to equalize the steam-pressure in the direction of the shaft, and thus avoid the danger of the machine becoming displaced in position. As I construct my machines, the pressure longitudinally is toward a common center from each direction.

The principal advantages of my double machine are economy in use, great durability, particularly of the packing, great power in work, arising from the fact that the disks are perfectly balanced by steam-pressure, and the friction is reduced to a minimum. For the same reason my machine runs without any noise whatever.

Having thus described my engine, what I claim as new therein and my own invention, which I desire to protect by Letters Patent, is—

1. The combination of two rotary engines, connected together diagonally, with a driving-shaft common to both engines, substantially as described.

2. In combination with two rotary engines, connected together and driven by a shaft common to both, the reheater C, substantially as described.

3. In combination with two rotary engines, connected together and driven by the same shaft, the reheater C, the live-steam pipes $c'$ $h^{16}$, and the exhaust-pipes $i^3$ $i^5$, and the pipes K K', substantially as described.

4. In a rotary steam-engine, the combination, with the piston-wings H, of the removable side packing $h^8$ $h^{11}$ $h^{13}$, constructed and arranged substantially as described and shown.

5. In a rotary steam-engine, the combination, with the piston-wings O, of the removable side packing P, constructed and arranged substantially as described and shown.

6. In a rotary steam-engine, the combination, with the disk, of the divided edge packing G, having an elastic filling, constructed and arranged substantially as described and shown.

7. In combination with the disk E', the rods Q and springs $p$ of the wings O and rings R, substantially as described.

8. The cylindrical packing-rings R R', with flanges $r$ and rectangular notches $r^2$, seats $r^3$, and grooves $r^4$, substantially as described.

9. In combination with the packing-rings R R', constructed substantially as described, the packing S, substantially as and for the purposes set forth.

10. In a rotary engine, the combination, with the head F, of the circular recess $e$, the gear $e^1$, the plate $e^2$, and the pinion $d^1$, substantially as described.

11. In combination with the head, the divided rings $f$ $f^1$ and springs $f^2$, substantially as described.

This specification signed and witnessed this 29th day of September, 1876.

GUSTAVUS R. WINKLER.

Witnesses:
R. N. DYER,
L. W. SEELY.